(12) United States Patent
Moats et al.

(10) Patent No.: US 8,250,450 B2
(45) Date of Patent: Aug. 21, 2012

(54) METHOD AND SYSTEM FOR USING REDUNDANCY TO EXCHANGE DATA IN A MULTICAST OR ONE WAY ENVIRONMENT

(75) Inventors: Samuel A. Moats, Winchester, VA (US); Stephen J. Grassi, Sterling, VA (US); Oscar F. Roeder, Stephens City, VA (US); Faith Power, Winchester, VA (US)

(73) Assignee: Ambriel Technologies, LLC., Winchester, VA (US)

( * ) Notice: Subject to any disclaimer, the term of this patent is extended or adjusted under 35 U.S.C. 154(b) by 1002 days.

(21) Appl. No.: 12/202,735

(22) Filed: Sep. 2, 2008

(65) Prior Publication Data

US 2009/0063941 A1    Mar. 5, 2009

Related U.S. Application Data

(60) Provisional application No. 60/935,795, filed on Aug. 31, 2007.

(51) Int. Cl.
*G06F 11/00* (2006.01)
(52) U.S. Cl. .................. 714/799; 714/6.22; 714/800
(58) Field of Classification Search .............. 714/799, 714/6.22, 6.24, 800, 801, 805
See application file for complete search history.

(56) References Cited

U.S. PATENT DOCUMENTS

| | | | |
|---|---|---|---|
| 2002/0023249 A1* | 2/2002 | Ternullo et al. | 714/807 |
| 2004/0153961 A1* | 8/2004 | Park et al. | 714/800 |
| 2004/0163030 A1* | 8/2004 | Haar et al. | 714/800 |
| 2005/0114728 A1* | 5/2005 | Aizawa et al. | 714/6 |
| 2008/0109707 A1* | 5/2008 | Dell et al. | 714/776 |

* cited by examiner

*Primary Examiner* — Scott Baderman
*Assistant Examiner* — Sarai Butler
(74) *Attorney, Agent, or Firm* — Millen, White, Zelano & Branigan, P.C.; William F. Nixon

(57) ABSTRACT

A system for use in one-way communications takes data from a source and parses it into work units. The work units may have a fixed size. The data of the work units is given to a redundant array of independent disks (RAID) library. The RAID library applies parity to the data and produces a number of output streams. Each stream includes data from the work units and redundant data from the parity application. The streams are combined and sent over a network. The inverse parity is applied on the receiving side to recreate the data. The redundant data is used in place of any data having an error condition, such as being lost or corrupted. The data is reconstructed on the receiving end without the need to resend data.

15 Claims, 3 Drawing Sheets

METHOD AND SYSTEM FOR USING REDUNDANCY TO EXCHANGE DATA IN A MULTICAST OR ONE WAY ENVIRONMENT

This application claims priority of U.S. Provisional Patent Application No. 60/935,795, filed Aug. 31, 2007, which is incorporated by reference herein.

FIELD OF THE INVENTION

The present invention relates to communication or the exchange of data within a network. More particularly, the present invention relates to sending and receiving data over a lossy network in a multicast environment or a one-way transmission by using redundancy to improve reliability.

DISCUSSION OF THE RELATED ART

All networks seek to exchange data in a reliable and timely manner between clients and hosts. Often, these networks are lossy in that data is lost during transmission. For example, a packet of data may be dropped during delivery of a file to a client. The packet of data is lost and not recoverable absent some indication to the source that the packet needs to be resent.

An example of a system 100 using a network 120 may be shown by FIG. 1. System 100 allows data, files, information and the like to be exchanged. For this example, a video file is sent from video source 102 to video client 110. Video source 102 generates a continuous stream of video data that is viewed by a user at video client 110. After generating the video data, encoder 104 converts the data into a continuous stream of characters compatible with the other components within network 100. The use of compression or encoding algorithms during these operations results in loss of data.

Packetizer 106 modifies the encoded data into packets of data suitable for delivery across network 120. Network 120 preferably is the internet, but also may be other networks, such as a local area network. Network 120 is inherently lossy so that packets from packetizer 106 are lost during transmission. When this occurs, depacketizer 108 sends a request 107 back to packetizer 106 that the dropped packet be resent.

Once the proper packets are received over network 120, depacketizer 108 strips the packet information from the data and provides the data stream to decoder 109. Decoder 109 reverses the encoding scheme used by encoder 104 to reconstruct the video stream. Video client 110 receives the reconstructed stream. The reconstructed stream experiences some loss of data due to compression and lost packets still not received from video source 102. Known systems, however, are able to compensate for the loss of the data so that the video shown on video client 110 is substantially similar to that generated by video source 102.

Systems exist that are unable to provide two-way communications between the receiving and sending parts. Two-way communications are impossible or unfeasible. Data is not resent due to loss because, for example, video source 102 would have no way of knowing what data to resend. In these environments, system 100 described above is unable to guarantee quality data delivery due to the lossy nature of network 120. Thus, the reconstructed video at video client 110 may be low quality or no use altogether.

SUMMARY OF THE INVENTION

The disclosed embodiments facilitate communication in one-way or multicast networks where no opportunity exists for resending data. To overcome the challenges described above, the disclosed embodiments apply parity to outbound data at a point between the encoding and packetizing operations. This parity permits reconstruction of any missing or lost data at the destination without the need to re-transmit packets.

The disclosed embodiments allow a system or network to send data in a one-way or multicast environment without losing the data to reliability problems or the lossy nature of the network. Files, programs, data, information and the like that must be sent without any loss within these type environments can do so. Further, the disclosed embodiments may perform these tasks without using additional paths or delays that accompany two-way communications.

Thus, the disclosed embodiments include a method for sending data in a one-way communication environment. According to the disclosed embodiments, a method for receiving data in a one-way communication environment is recited. A method for sending data within a one-way communication environment also is recited.

Further according to the disclosed embodiments, a system for sending data in a one-way communication environment is recited.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
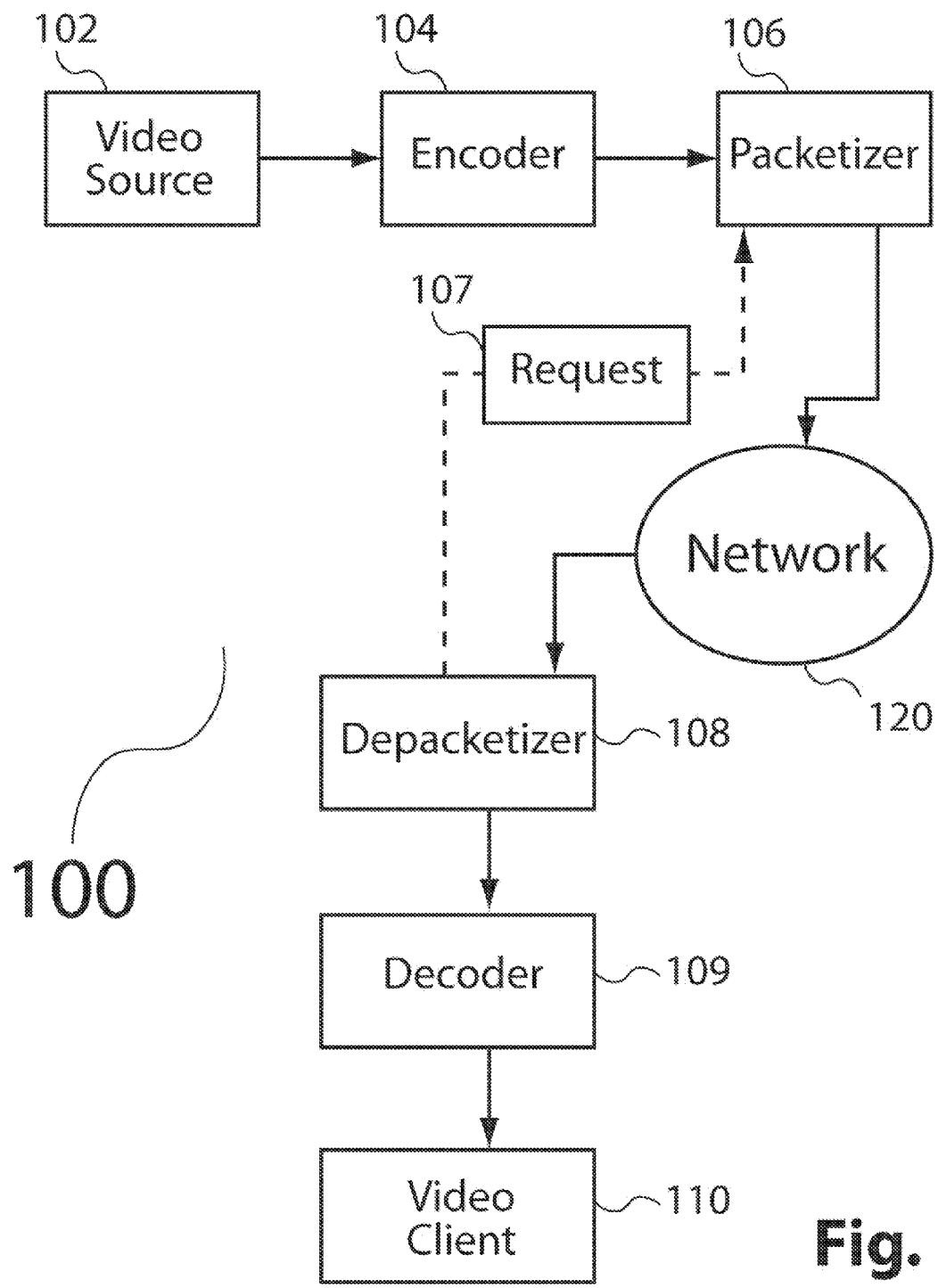
FIG. 1 illustrates a system for sending data in a two-way environment.
Figure 2:
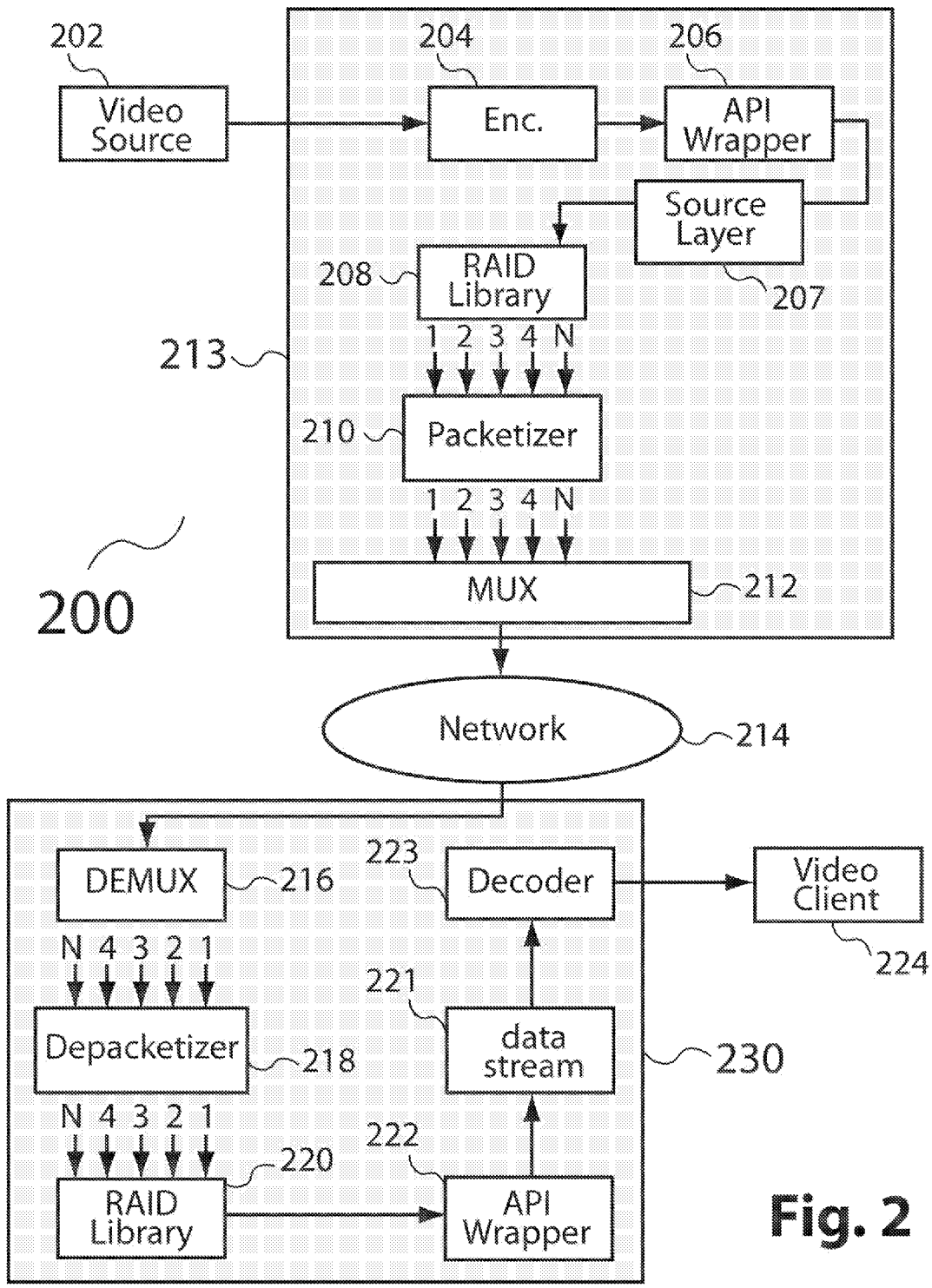
FIG. 2 illustrates a system for sending and receiving data in a one-way or multicast environment according to the disclosed embodiments.

FIG. 2 depicts a system 200 for exchanging data in a one-way or multicast environment according to the disclosed embodiments. Using the video example from above, video source 202 uses system 200 to send video data to video client 224 over network 214. Network 214 may be a lossy network, such as the internet.

System 200 may represent a multicast or one-way environment. A multicast environment broadcasts or sends data over different paths to a number of destinations. For example, video client 224 may be one of a number of video clients receiving information from video source 202. Because of the numerous receivers, video source 202 cannot receive and comply with a variety of requests for lost data. A one-way, or unicast, environment simply indicates the receiving end cannot communication with the transmitting end. Thus, a multicast environment is a one-way environment in that it does not send requests back to video source. For simplicity, system 200 will be referred to as supporting a one-way environment.

Video source 202 generates video data. Video source 202 may be a camera or other device that uses applicable software or embedded instructions to capture the data. Other devices and programs may generate data for use with the disclosed embodiments. For example, a device to capture sounds instead of video may be used.

Encoder 204 receives the generated data and encodes it to characters or data transmittable over network 214. Encoder 204 may use known compression or encoding algorithms to quantify the data. These processes facilitate transmission of the data as they reduce it to a manageable size using known standard protocols, such as MPEG. The stream of characters representing the video data may be known as source layer 207, shown in FIG. 2.

Application program interface (API) wrapper 206 receives source layer 207 and breaks it into work units having a fixed size. API wrapper 206 counts off an X number of characters to create the work unit. The fixed size of the work units is supportable by the components within system 200. For example, a work unit may be 1500 bytes. Alternatively, a work unit may be 3000 bytes. API wrapper 206 sets aside the amount of bytes for each work unit as it receives source layer 207. Preferably, API wrapper 206 is a program residing between encoder 204 and the other components of transmitter 213 that are disclosed in greater detail below.

The work units of source layer 207 are fed into a redundant array of independent disks (RAID) library 208. RAID library 208 refers to a manner to store the same data in different places on multiple disks. The disclosed embodiments, however, are not storing the same data on multiple disks but using the operation of RAID library 208 to facilitate the transmission of data in a one-way communication environment. API wrapper 206 makes RAID library 208 appear as a network socket to encoder 204. Preferably, encoder 204 views RAID library 208 as a standard user datagram protocol (UDP) network socket so that encoder 204 believes it is handing off source layer 207 to packetizer 210.

The disclosed embodiments make use of data striping with a parity library as provided by RAID library 208. RAID library 208 takes the information broken into work units and applies parity to data as it is output into an N number of streams, as shown in FIG. 2. In other words, the work units from API wrapper 206 are fed into RAID library 208 to form a series of N output streams of unformatted characters or data based on source layer 207. Preferably, RAID library 208 forms 5 output streams, but the number may be any value desired, such as 6, 10, 12 and so on. As shown in FIG. 2, streams 1, 2, 3, 4 and N output from RAID library 208.

The output streams include the work units within source layer 207 with parity applied. Using the 1500 byte example given above, a frame of video data may comprise three work units of 1500 bytes each, or a total of 4500 bytes. The frame of data is generated by API wrapper 206 and is fed into RAID library 208. RAID library 208 uses its internal processes and operations to apply parity to the frame, which results in N output streams. The combined size of the work units in the output streams for the frame is greater than the fixed size of the frame.

Using the examples given above, RAID library 208 outputs five streams of data to packetizer 210. Upon receipt of the frame of 4500 bytes, or three work units, RAID library 208 applies parity algorithms to include redundant data within the work units and outputs a 7500 output frame over streams 1, 2, 3, 4 and 5. RAID library 208, in a sense, creates two parity work units, or blocks, to go along with the three work units created by API wrapper 206. Using the example, each stream coming out of RAID library 208 may include ⅔s unique content and ⅓ redundant content from other streams.

RAID library 208 uses a parity control algorithm such that each error correction parity block is striped, or divided, across all five output streams. If two parity blocks are used, then both blocks are divided across the output streams. The original frame of 4500 bytes is reconstructed from any three good output streams for that particular frame.

Packetizer 210 receives the N number of streams and places the data, including the parity data, into packets ready for transmission over network 214. Packetizer 210 generates internet protocol (IP) packet-sized chunks to flow on a path through network 214. Packetizer 210 adds headers and applicable information for the destination of the packets, such as an IP address and the like.

Further, packetizer 210 ensures that packets of data are appropriate in size. Packetizer 210 seeks the lowest common denominator in size, or the smallest size supported, in creating the packets. Some video clients may not support large packet sizes, so the smallest block size is used to prepare work units and parity data of the output streams for transmission over network 214.

Once all data over output streams 1 through N are packetized, the streams are fed into multiplexer 212. Multiplexer 212 multiplexes the streams into one stream to flow over paths within network 214 according to known protocols. The stream of data is then sent over network to demultiplexer 216. The components of system 200 up to the sending of data over network 214 may be known as transmission, or sending, device 213. The components may be considered logical components of the physical transmission device 213.

Network 214 delivers the data to reception device 230 that serves video client 224 as one stream. Because network 214 probably is a lossy network, parts of the output stream may have been lost during delivery.

Demultiplexer 216 receives the transmitted stream and demultiplexes it into the N number of output streams set by RAID library 208. As shown in FIG. 2, streams N, 4, 3, 2 and 1 are generated by demultiplexer 216. Depacketizer 218 receives the streams and removes the headers and other packet information to reformat the data back into the work unit having the parity as generated by RAID library 208. The streams are fed into RAID library 220.

RAID library 220 runs the inverse of the parity algorithm used by RAID library 208 to recover the original data frame generated from source layer 207. Using the example disclosed above, RAID library 220 reconstructs the original 4500 byte frame from the information received over the five streams. Any missing or "dirty" packets are rebuilt using the parity information found in the other streams. A dirty packet may be one where the data is corrupted or unuseable even though the packet is not lost over network 214.

API wrapper takes data stream 221 generated by RAID library 220 and reconfigures it using the reconstructed work units to recreate source layer 207. The work units for each frame are placed together to reconstruct that frame. For example, the data is taken from the 1500 byte work unit format and placed back into the original file or data size. Source layer 207 in the form of data stream 221 is delivered to decoder 223. Decoder 223 applies the appropriate decoding and decompression algorithms to regenerate the original video data for delivery to video client 224.

System 200 may includes multiple reception devices 230 that serve a number of video clients 224. The reception devices include the appropriate algorithms and inverse of the parity algorithms to reconstruct the original video data captured by video source 202. With these features, system 200 can deliver data in a multicast environment without the need for requests or two-way communication.

Figure 3:
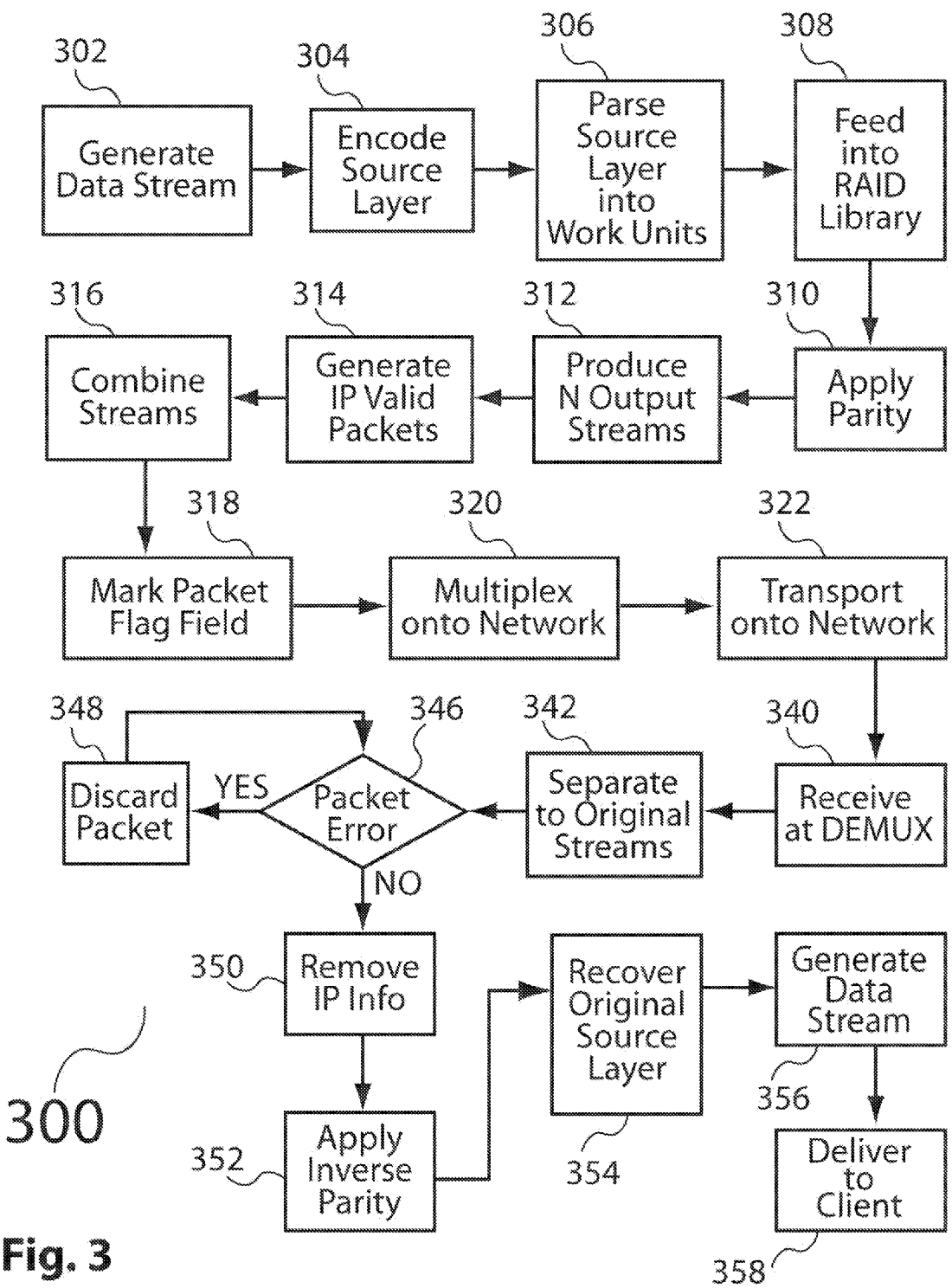
FIG. 3 illustrates flowchart for exchanging data using parity according to the disclosed embodiments.

FIG. 3 depicts a flowchart for exchanging data using parity according to the disclosed embodiments. The steps shown in FIG. 3 may be executed within a device, machine or by a program having instructions to perform the steps disclosed. For simplicity, FIG. 3 will refer back to features disclosed by FIG. 2. The methods and processes disclosed by FIG. 3 may be used for any type of data, and is not limited to video systems.

Step 302 executes by generating a data stream by video source 202. Video source 202 captures a video. Step 304 executes by encoding the captured video. Step 306 executes by parsing the source layer into work units by API wrapper 206. As disclosed above, the work units have a fixed size, such as 1500 bytes. Step 308 executes by feeding, or sending, the work units into RAID library 208.

Step 310 executes by applying parity to the work units using RAID library 208. During this step, redundant data is created from the work units. The redundant data may be placed with the data of the work units. As disclosed above, RAID library 208 places redundant and original data within its output streams that are formed according to its protocols or parity algorithms. The application of parity to the data results in a larger amount of data going out of RAID library 208 than coming from API wrapper 206. Step 312 executes by producing N output streams from RAID library 208. Each output stream includes a work unit plus redundant data, or parity.

Step 314 executes by generating IP valid packets using packetizer 210. Step 316 executes by combining the N number of output streams using multiplexer 212 to form one data stream. Step 318 executes by marking a packet flag field. Step 320 executes by multiplexing the stream onto network 214. Step 322 executes by transporting the packets over network 214. For example, the packets may be routed to a destination according to its address within a header attached by packetizer 210.

Step 340 executes by receiving the packets at reception device 230. Step 342 executes by separating the received packets into their respective output streams by demultiplexer 216. For example, if RAID library 208 generated five output streams, then demultiplexer 216 will feed five output streams into depacketizer 218.

Step 346 executes by determining whether the received packet includes an error or is "dirty," as disclosed above. If yes, then step 348 executes by discarding the packet. No message or request is forwarded to any component of transmission device 213. If step 346 is no, then flowchart 300 proceeds to step 350. Step 346 may be repeated until all packets have been analyzed for errors. Further, step 346 may occur simultaneously on all N number of output streams.

Step 350 executes by removing the IP information by depacketizer 218. Headers and other information may be stripped to get back to the work units. Step 352 executes by executing the inverse parity algorithm by RAID library 220. RAID library 220 uses the inverse of the parity algorithm to reassemble the work units, including the parity work units. If any work units are missing due to errors, the parity work units may be used to reform the data.

Step 354 executes by recovering the original source layer from RAID library 220 and API wrapper 222. RAID library 220 provides the work units to API wrapper 222, which places the work units back into their original configuration. Step 356 executes by generating the data stream from the work units, and applying any applicable decoding algorithms by decoder 223. Step 358 executes by delivering the video data to video client 224.

Thus, according to the disclosed embodiments, data may be delivered to video client 224 without the need for a path back to the transmission side in case of error. Any bad packet or data may be discarded without the need to resend the packet from reception device 213. This feature is desirable in those situations where communication back to the transmission side is not possible, or in a multicast environment that has multiple receivers. The data is still received and reassembled despite the loss of some of the data.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for sending data in a one-way communication environment, the method comprising:
    parsing data within a signal into a plurality of work units;
    producing a number of output streams for the plurality of work units using a redundant array of independent disks (RAID) library;
    applying parity to the number of output streams using the RAID library, wherein each stream includes redundant data from the plurality of work units; and
    outputting the number of output streams over a network by using a multiplexer to combine the output streams.

2. The method of claim 1, further comprising packetizing the plurality of work units for distribution over the network.

3. The method of claim 1, wherein the applying step includes using the redundant array of independent disks (RAID) library to apply an algorithm to provide redundancy over the number of output streams.

4. The method of claim 1, wherein the applying step includes using a parity algorithm to generate the data for each of the number of output streams.

5. The method of claim 1, wherein the parsing step includes parsing the data into the plurality of work units having a fixed size.

6. The method of claim 1, further comprising using an application program interface (API) wrapper to parse the data.

7. A method for receiving data in a one-way communication environment, the method comprising:
    using a demultiplexer to generate a number of output streams from a signal received over a network;
    receiving number of output streams from the demultiplexer, wherein the number of output streams includes redundant data;
    determining whether data within the number of output streams includes an error condition;
    removing the data having the error condition from the number of output streams;
    applying an inverse parity algorithm to the data within the plurality of output streams to generate a plurality of work units and the redundant data using a redundant array of independent disks (RAID) library; and
    recovering original data using the plurality of work units and the redundant data.

8. The method of claim 7, further comprising separating a data stream from the network to generate the number of output streams.

9. The method of claim 7, wherein the applying step includes using redundant array of independent disks (RAID) library to apply the inverse parity on the output streams according to the inverse parity algorithm selected by the RAID library.

10. The method of claim 7, further comprising determining an error condition, wherein the error condition results in a lost or corrupt packet within an output stream.

11. A method for sending and receiving data within a one-way communication environment over a network, the method comprising:
   parsing a source layer of data into a plurality of work units;
   applying a parity algorithm to the plurality of work units using a first redundant array of independent disks (RAID) library, wherein each of the plurality of work units includes redundant data;
   producing a number of output streams for the plurality of work units;
   combining the number of output streams into a data stream;
   sending the data stream over a network to a destination;
   separating the data stream into the number of output streams;
   applying an inverse parity algorithm using a second redundant array of independent disks (RAID) library to generate the plurality of work units;
   using the redundant data to recover missing data from the plurality of work units; and
   generating the source layer from the plurality of work units.

12. The method of claim 11, wherein the first applying step includes using the first RAID library to select the parity algorithm.

13. The method of claim 11, further comprising generating packets for use within the network from the plurality of work units including the redundant data.

14. A system for sending data in a one-way communication environment, the system comprising:
   an application program interface (API) wrapper to parse data into a plurality of work units;
   a first redundant array of independent disks (RAID) library to receive the plurality of work units, wherein the RAID library produces a number of output streams and applies a parity algorithm to the plurality of work units within the number of output streams, wherein the data is recoverable using the plurality of work units within the number output streams and redundant data from the parity algorithm;
   a multiplexer to combine the output streams into a signal to transmit over a network;
   a demultiplexer to generate the output streams from the signal; and
   a second RAID library to receive the output streams and generate the work units by applying an inverse parity algorithm.

15. The system of claim 14, further comprising a packetizer to receive the number of output streams and ensure that the plurality of work units are appropriate in size.

* * * * *

UNITED STATES PATENT AND TRADEMARK OFFICE
CERTIFICATE OF CORRECTION

| | | |
|---|---|---|
| PATENT NO. | : 8,250,450 B2 | Page 1 of 1 |
| APPLICATION NO. | : 12/202735 | |
| DATED | : August 21, 2012 | |
| INVENTOR(S) | : Samuel A. Moats et al. | |

It is certified that error appears in the above-identified patent and that said Letters Patent is hereby corrected as shown below:

IN THE CLAIMS:

Column 6, Claim 7, Line 47 reads: "receiving number of output streams from the demulti-" should read --receiving the number of output streams from the demulti- --.

Signed and Sealed this
Twenty-seventh Day of November, 2012

David J. Kappos
*Director of the United States Patent and Trademark Office*